United States Patent
So (10) Patent No.: US 7,845,311 B2
(45) Date of Patent: Dec. 7, 2010

(54) ANIMAL TRAINING DEVICE HAVING PAIR OF COLLAPSIBLE ELECTRODES AND ELECTRONIC WHISTLE AND METHOD OF CONTROLLING THE SAME

(76) Inventor: Ho Yun So, 8-1006 Kwangjiang Apt., 28 Youido-dong, Yongdungpo-gu, Seoul (KR) 150-762

( * ) Notice: Subject to any disclaimer, the term of this patent is extended or adjusted under 35 U.S.C. 154(b) by 463 days.

(21) Appl. No.: 12/050,659

(22) Filed: Mar. 18, 2008

(65) Prior Publication Data
US 2009/0205583 A1    Aug. 20, 2009

(30) Foreign Application Priority Data
Feb. 14, 2008    (KR) ...................... 10-2008-0013603

(51) Int. Cl.
*A01K 15/02* (2006.01)
*A01K 27/00* (2006.01)
(52) U.S. Cl. .................. 119/720; 119/859; 119/719
(58) Field of Classification Search ......... 119/719–721, 119/859; 231/7; 340/573.1–573.3
See application file for complete search history.

(56) References Cited
U.S. PATENT DOCUMENTS

| | | | |
|---|---|---|---|
| 4,694,284 A * | 9/1987 | Leveille et al. .............. | 340/574 |
| 5,099,797 A | 3/1992 | Gonda | |
| 5,207,178 A * | 5/1993 | McDade et al. .............. | 119/859 |
| 5,471,954 A | 12/1995 | Gonda et al. | |
| 5,666,908 A | 9/1997 | So | |
| 2008/0156278 A1* | 7/2008 | Mainini et al. ............... | 119/718 |

* cited by examiner

*Primary Examiner*—Son T Nguyen
*Assistant Examiner*—Danielle Clerkley
(74) *Attorney, Agent, or Firm*—Holme Roberts & Owen LLP (57) ABSTRACT

Disclosed herein is an animal training device having a pair of collapsible electrodes and an electronic whistle, which includes a transmitter and a receiver. The transmitter includes an electrode collapse switch for generating a signal used to collapse or erect the electrodes, an electronic whistle switch for generating a signal causing an electronic whistle to be blown, a transmission control unit for performing control on an electronic whistle unit such that a whistle is blown, a wireless transmission unit for transmitting a wireless signal in response to the control signal of the transmission control unit, and the electronic whistle unit. The receiver includes a wireless reception unit, a reception control unit for performing control such that the electrodes are collapsed or erected, a high voltage generation, an electrode driving unit for collapsing or erecting the electrodes, and the left and right electrodes.

6 Claims, 9 Drawing Sheets

PRIOR ART

ANIMAL TRAINING DEVICE HAVING PAIR OF COLLAPSIBLE ELECTRODES AND ELECTRONIC WHISTLE AND METHOD OF CONTROLLING THE SAME

BACKGROUND OF THE INVENTION

1. Field of the Invention

The present invention relates generally to an animal training device having a pair of collapsible electrodes and an electronic whistle and a method of controlling the same, and, more particularly, to an animal training device having a pair of collapsible electrodes and an electronic whistle and a method of controlling the same, which erect electrodes during training so that the electrodes come into contact with the body of an animal, and collapse the electrodes when training is not performed or when traveling so that the electrodes do not come into contact with the skin of the animal, thereby reducing the irritation of the skin attributable to friction by mining the time period for which the electrodes are in contact with the body of the animal, and which provides an electronic whistle in a transmitter, thereby allowing the animal to be called by blowing a whistle and indicating the location of a master.

2. Description of the Related Art

Figure 1:
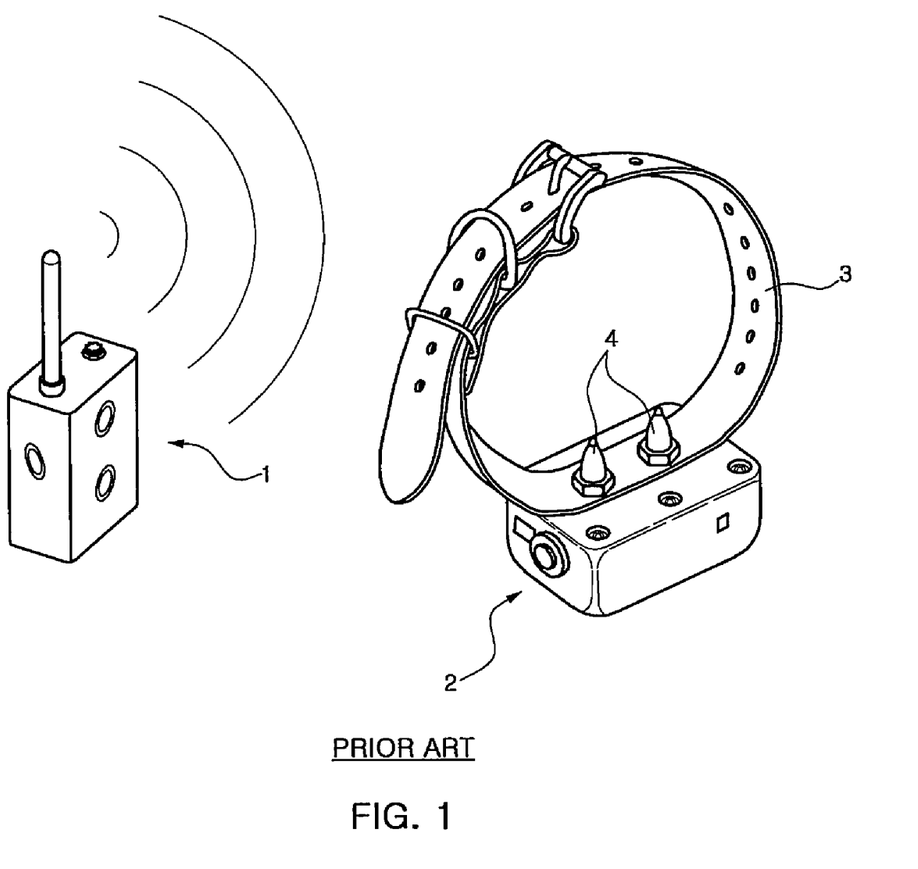
FIG. 1 shows the transmitter and receiver of a conventional animal training device.

A conventional animal training device is divided into a transmitter 1 and a receiver 2, as shown in FIG. 1. When a user makes a sound with his/her voice or wirelessly sends a specific signal from the transmitter 1 in order to train an animal, the receiver 2 reacts to the signal and then applies vibration, sounds, or shocks to the animal.

Generally, the receiver 2 is attached to a collar 3 and is worn around the neck of an animal. Electric shocks are applied from a pair of electrodes 4 provided on the neck of the animal, thereby instructing an animal, which does not obey a command, to act in compliance with the command.

The electrodes, used to apply electric shocks to an animal, are made of electrically conductive metal, protrude from the surface of the receiver 2, and come into contact with the skin around the neck of an animal, with the result that the electrode causes irritation of the skin around the neck when training is being performed or when the training is terminated, so that the skin may be damaged due to continuous friction.

For these reasons, when training is not performed, a dummy device for training is put on the animal. However, such work is troublesome. Further, since the electrode terminals of the receiver of the conventional animal training device protrude, there are problems in that the animal training device may be broken or bent and thus damaged in the case in which the animal training device collides with external objects due to carelessness when it is separated from the body of an animal and is stored, and in that the internal device thereof may break due to the application of excess current when the animal training device comes into contact with a metal object.

Further, traditionally, when an animal, such as a dog, is employed for hunting or is trained, a trainer blows a whistle in his/her mouth or hangs a whistle around his/her neck and blows the whistle in his/her mouth when necessary. When the trainer tries to blow a whistle when it is cold in the winter while wearing gloves and holding various devices in both hands, there is inconvenience in that the trainer must put the devices (for example, guns or training equipment) down on the ground, then search his/her pockets or bags for the whistle, place it in his/her mouth, and then send a signal to the dog which is being trained.

If an electronic whistle device and an electronic whistle switch for operating the same are provided in the transmitter, a signal is sent to a dog by operating the electronic whistle using the training device, thereby removing the inconvenience of being required to put devices down on the ground or searching one's pockets for the whistle.

The conventional animal training device is divided into a transmitter and a receiver. When a wireless signal is sent from the transmitter in order to train an animal, the receiver receives the wireless signal and then applies electric shocks or vibrations to the animal which is being trained. However, the direction of such a wireless signal cannot be determined, thereby confusing the animal which is being trained.

Therefore, if a whistle is fitted in the transmitter and then the transmitter sends the sound of the whistle to an animal in a faraway place, it is possible for the animal to determine the direction of the sound (the position of the trainer).

SUMMARY OF THE INVENTION

Accordingly, the present invention has been made keeping in mind the above problems occurring in the prior art, and an object of the present invention is to provide an animal training device having a pair of collapsible electrodes and an electronic whistle which enables the electrodes of the receiver of the animal training device to be collapsed or erected.

Another object of the present invention is to provide an animal training device having a pair of collapsible electrodes and an electronic whistle, which enables the electrodes of a receiver, which causes irritation of the skin of the neck of an animal, to be collapsed or erected, so that the time period for which the electrodes are in contact with the neck of an animal is minimized by collapsing the electrodes when traveling or taking a break.

Another object of the present invention is to provide an animal training device having a pair of collapsible electrodes and an electronic whistle which enables the protruded electrodes of a receiver to be collapsed, thereby reducing the unpleasant appearance of the external shape thereof, ensuring safety when traveling and storing, and avoiding the bother of putting a training dummy on the animal.

Another object of the present invention is to provide an animal training device having a pair of collapsible electrodes and an electronic whistle in which an electronic whistle is provided in a transmitter, so that the bother of preparing an additional whistle can be avoided by causing an electronic whistle to be blown using a simple switch operation.

Another object of the present invention is to provide an animal training device having a pair of collapsible electrodes and an electronic whistle which can instruct an animal to comply with a command using an electronic whistle.

In order to accomplish the above objects, the present invention provides an animal training device having a pair of collapsible electrodes and an electronic whistle, including a transmitter and a receiver; wherein the transmitter includes an electrode collapse switch for generating a signal used to collapse or erect the pair of electrodes of the receiver; an electronic whistle switch for generating a signal used to cause an electronic whistle to be blown; a transmission control unit for receiving a signal from the electrode collapse switch and then transmitting the corresponding signal, and receiving a signal from the electronic whistle switch and then performing control on an electronic whistle unit such that a whistle is blown; a wireless transmission unit for transmitting a wireless signal which corresponds to the signal from the electrode collapse switch in response to the control signal of the transmission control unit; and the electronic whistle unit for enabling a whistle to be blown under the control of the transmission control unit; and wherein the receiver includes a wireless reception unit configured to receive a signal from the transmitter; a reception control unit configured to receive a command, instructing the electrodes to be collapsed or erected, from the wireless reception unit, and then to perform control such that the electrodes are collapsed or erected; a high voltage generation unit configured to generate high voltage under the control of the reception control unit; an electrode driving unit configured to collapse or erect the electrodes under the control of the reception control unit; and the pair of left and right electrodes configured to be collapsed or erected by receiving power from the electrode driving unit, and to receive high voltage electricity generated by the high voltage generation unit.

The receiver according to the present invention further includes a pair of accommodation cavities configured to respectively accommodate the pair of collapsed electrodes; a pair of protrusion holes formed in the bottoms of the respective accommodation cavities; a pair of movement prevention protrusions configured to protrude through the respective protrusion holes, and to have respective circularly-shaped bottoms, diameters of which are larger than those of the protrusion holes, and be inserted into respective movement prevention depressions formed in the bottoms of the pair of electrodes; and a pair of movement prevention springs provided on the bottoms of the respective movement prevention protrusions, and configured to supply elastic force transmitted through the protrusion holes.

The electrode driving unit according to the present invention includes a motor configured to perform forward rotation and reverse rotation under the control of the reception control unit; a motor pulley attached to the rotating shaft of the motor; left and right electrode rotating shafts respectively attached to the pair of electrodes; a pair of electrode pulleys attached to the respective left and right electrode rotating shafts, and configured to perform forward rotation and reverse rotation based on the rotation of the motor; and left and right electrode belts configured to transmit power by connecting the pair of left and right electrode pulleys to the motor pulley.

The electrode driving unit according to the present invention further includes a motor configured to perform forward rotation and reverse rotation under the control of the reception control unit; a motor gear attached to the rotating shaft of the motor; left and right electrode rotating shafts respectively attached to the bottoms of the pair of electrodes; a pair of left and right electrode gears respectively attached to the left and right electrode rotating shafts, and configured to perform forward rotation and reverse rotation based on the rotation of the motor; a first transmission gear configured to perform rotation while simultaneously engaging with the motor gear, the left electrode gear, and a second transmission gear; and the second transmission gear configured to transmit the rotation power of the first transmission gear to the right electrode gear.

The transmission control unit according to the present invention performs control such that an electronic whistle is blown and a signal used to apply an electric shock is transmitted to the receiver when two input signals are successively received from the electronic whistle switch, performs control on the electronic whistle unit such that only an electronic whistle is blown when a single input signal is received from the electronic whistle switch, receives a frequency signal and a sound signal respectively selected using a frequency switch and a sound switch, and then performs control on the electronic whistle unit such that an electronic whistle is blown using the selected frequency signal and sound signal through the electronic whistle unit.

The electronic whistle switch according to the present invention is replaced with four mode switches, so that mode signals for performing operations in four modes, that is, an electronic whistle and electric shock mode, an electronic whistle mode, an intermittent electronic whistle mode, and an electronic whistle and vibration mode, are input to the transmission control unit.

The present invention provides a method of controlling an animal training device having a pair of collapsible electrodes and an electronic whistle, the method including a first step of performing initialization, receiving a frequency signal and a sound signal, respectively selected using a frequency switch and a sound switch, and then making a setting such that an electronic whistle is blown using the selected frequency and sound by the electronic whistle unit; a second step of determining whether a first mode selection signal has been input, and if the first mode selection signal has been input, performing control on the electronic whistle unit such that an electronic whistle is output and simultaneously performing control on a receiver such that the electric shock is applied to an animal by transmitting a signal used to apply an electric shock; a third step of, if the first mode selection signal has not been input at the second step, determining whether a second mode selection signal has been input, and alternatively, if the second mode selection signal has been input, performing control on the electronic whistle unit such that an electronic whistle is output; a fourth step of, if the second mode selection signal has not been input, determining whether a third mode selection signal has been input, and, if the third mode selection signal has been input, performing control on the electronic whistle unit such that an electronic whistle is intermittently output; and a fifth step of, if the third mode selection signal is not input, determining whether a fourth mode selection signal has been input, and, if the fourth mode selection signal has been input, performing control on the electronic whistle unit such that an electronic whistle is output and simultaneously control is performed on the receiver such that to a signal used to apply vibration is transmitted, so that vibration is applied to an animal from the receiver.

BRIEF DESCRIPTION OF THE DRAWINGS

The above and other objects, features and other advantages of the present invention will be more clearly understood from the following detailed description, taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Hereinafter, preferred embodiments of the present invention will be described in detail with reference to the attached drawings.

Figure 2:
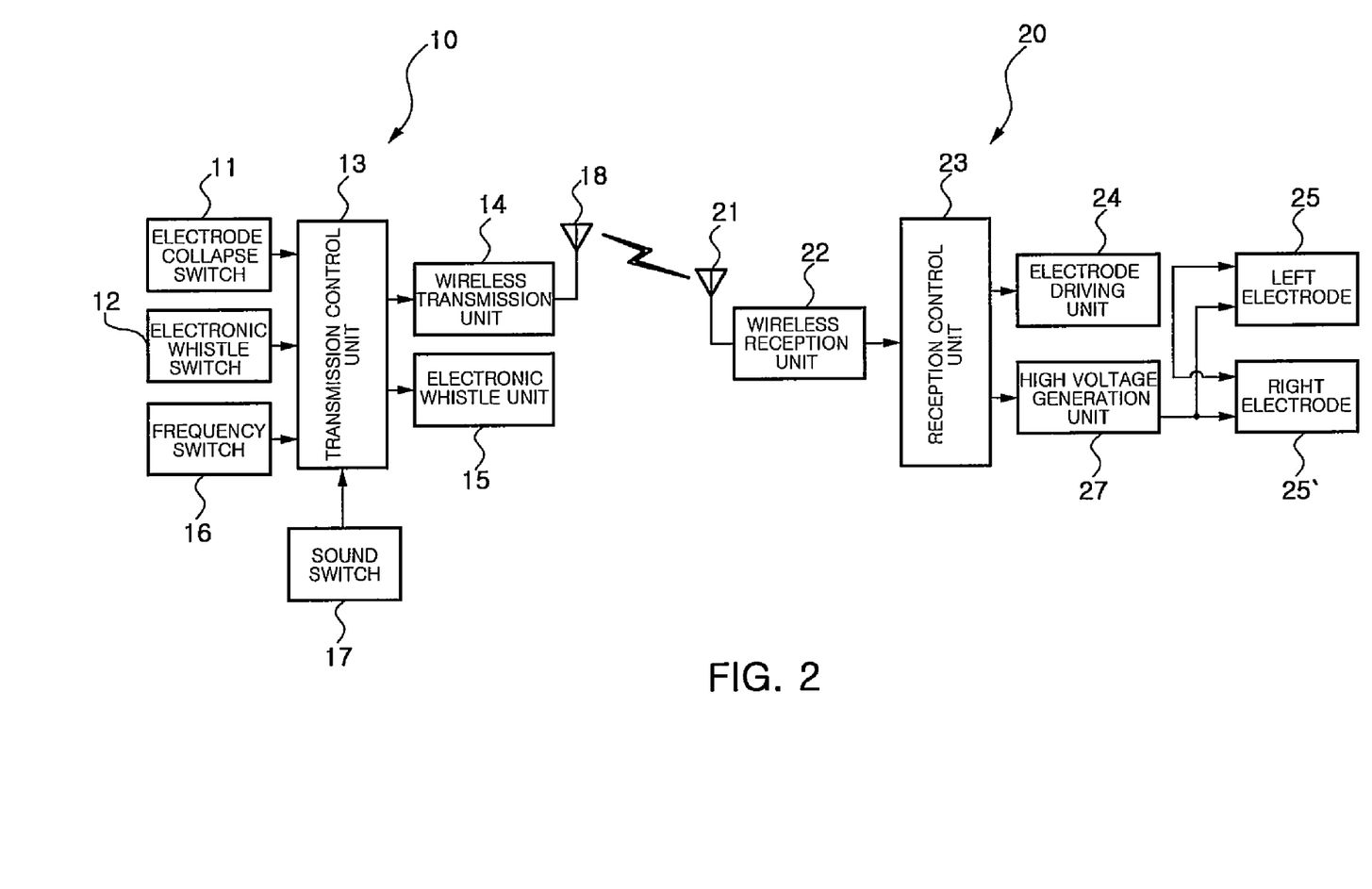
FIG. 2 is a block diagram showing the configuration of the transmitter and receiver of an animal training device having a pair of collapsible electrodes and an electronic whistle according to the present invention.

FIG. 2 is a block diagram showing the configuration of the transmitter and receiver of an animal training device having a vibration touch button according to the present invention.

The transmitter 10 of the animal training device according to the present invention includes an electrode collapse switch 11 for generating a signal used to collapse or erect the electrodes of the receiver, an electronic whistle switch 12 for generating a signal used to cause an electronic whistle to be blown, a transmission control unit 13 for receiving an electrode collapse signal from the electrode collapse switch 11 and then transmitting the electrode collapse signal, and receiving the signal, used to cause an electronic whistle to be blown, from the electronic whistle switch 12 and then performing control on an electronic whistle unit 15 such that a whistle is blown, a wireless transmission unit 14 for transmitting a signal which corresponds to the signal from the electrode collapse switch 11 in response to the control signal of the transmission control unit 13, the electronic whistle unit 15 for enabling a whistle to be blown under the control of the transmission control unit 13, a frequency switch 16 for adjusting the frequency of the electronic whistle, and a sound switch 17 for adjusting the sound of the electronic whistle.

The receiver 20 includes a wireless reception unit 22 configured to receive a signal from the transmitter 10, a reception control unit 23 configured to receive a command, instructing the electrodes 25 and 25' to be collapsed or erected, from the wireless reception unit 22, and then to perform control such that the electrodes 25 and 25' are collapsed or erected, a high voltage generation unit 27 configured to generate high voltage under the control of the reception control unit 23, an electrode driving unit 24 configured to collapse or erect the electrodes under the control of the reception control unit 23, and a pair of left and right electrodes 25 and 25' configured to be collapsed or erected by receiving power from the electrode driving unit 24 and to receive the high voltage electricity generated by the high voltage generation unit 27. Here, reference numeral 18, which has not been described, indicates a transmission antenna.

Figure 3:
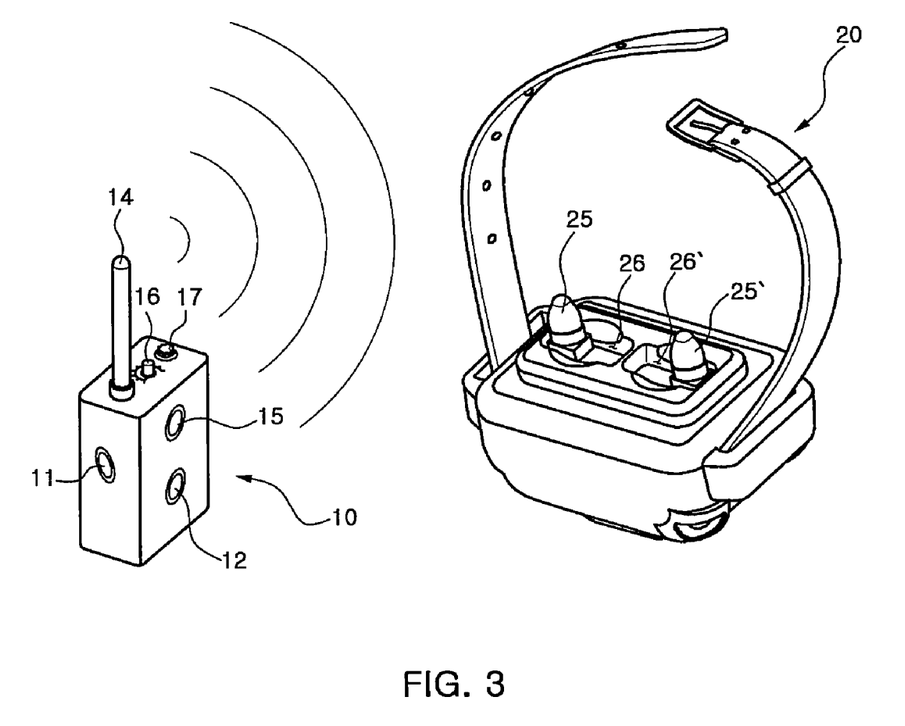
FIG. 3 is a perspective view showing the transmission/reception state between the transmitter and receiver of the animal training device having a pair of collapsible electrodes and an electronic whistle according to the present invention.

FIG. 3 is a perspective view showing the transmission/reception state between the transmitter and receiver of the animal training device having a pair of collapsible electrodes according to the present invention.

The electrode collapse switch 11 may employ a toggle switch, the state of which switches from a previous state to the inverted state thereof whenever the switch is pressed, or a toggle switch which includes two stages, that is, up and down stages, so that an electrode is erected if the toggle switch is in the up stage, and the electrode is collapsed if the toggle switch is in a down stage.

When a user wants to travel after terminating an animal training, the user presses the electrode collapse switch 11 so as to collapse the electrodes 25 and 25', which cause irritation of the neck of an animal, with the result that an electrode collapse signal is input to the transmission control unit 13, so that the transmission control unit 13 performs control on the wireless transmission unit 14 such that the electrode collapse signal is modulated using, for example, Frequency Modulation (FM), and is then emitted to the air through the transmission antenna 18.

The electrode collapse signal, transmitted from the transmitter 10, is received by the receiver 20 through a reception antenna 21, demodulated by the wireless reception unit 22, and then input to the reception control unit 23. When the electrode collapse signal is received, the reception control unit 23 drives the electrode driving unit 24 such that the pair of electrodes 25 and 25' is collapsed and then accommodated in receptive accommodation cavities 26 and 26', as shown in FIG. 3.

When the user wishes to resume animal training again, the user presses the electrode collapse switch 11, with the result that an electrode erection signal is input to the transmission control unit 13, so that the transmission control unit 13 performs control on the wireless transmission unit 14 such that the electrode erection signal is modulated using, for example, FM modulation, and is than emitted to the air through the transmission antenna 18.

The electrode erection signal, transmitted from the transmitter 10, is received by the receiver 20 through a reception antenna 21, demodulated by the wireless reception unit 22, and then input to the reception control unit 23. When the electrode erection signal is received, the reception control unit 23 drives the electrode driving unit 24 such that the pair of electrodes 25 and 25' is erected, that is, the pair of electrodes 25 and 25' is erected from the receptive accommodation cavities 26 and 26', as shown in FIG. 3.

Figure 4A:
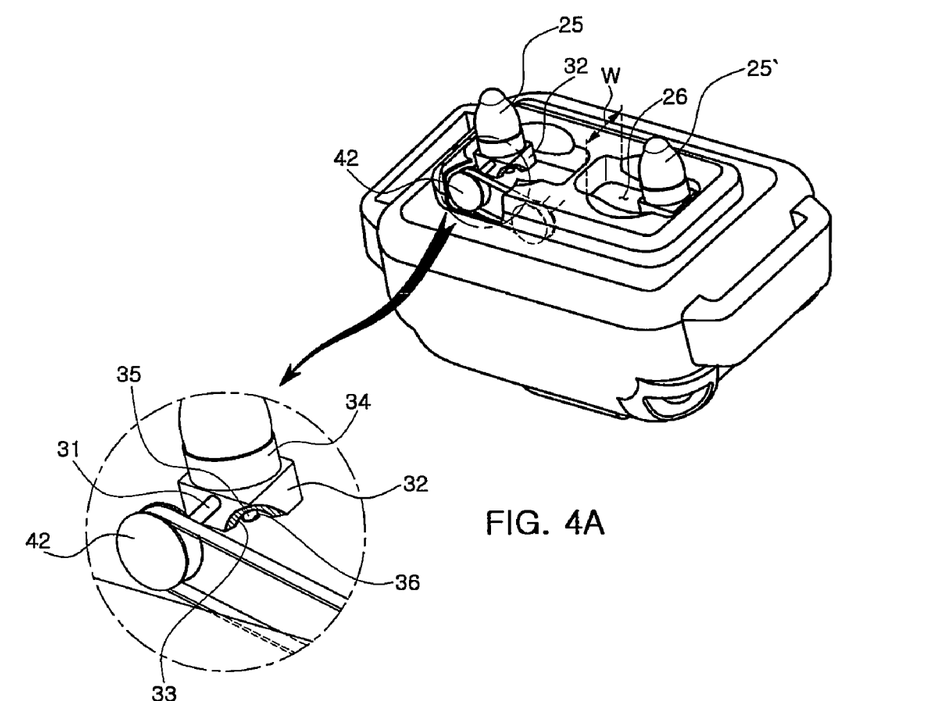
FIGS. 4A and 4B are partially cut away views showing part of the upper portion of the receiver according to the present invention.
Figure 4B:
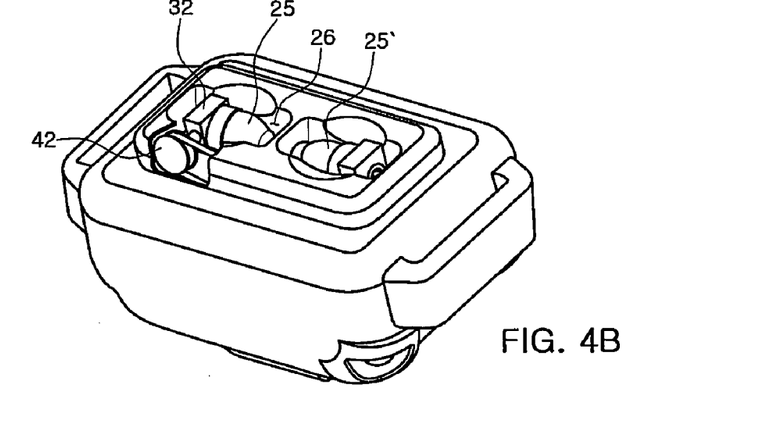

FIGS. 4A and 4B are partially cut away views showing part of the upper portion of the receiver according to the present invention.

Each rotating rolling unit 32, the rotating shaft 31 of which is fastened to the bottom of the electrode 25 or 25' of the receiver 20 according to the present invention, is disposed across the length of the accommodation cavity 26 or 26'. The rotating shaft 31 is extended while passing through each of the side walls in the accommodation cavity 26 or 26', and is inserted into a pulley 40.

The rotating rolling unit 32 is slightly narrower than the width 'w' of the accommodation cavity 26 or 26', so that the rotating rolling unit 32 can be freely rotated around the rotating shaft 31. The rotating rolling unit 32 has a movement prevention depression 33 in the bottom thereof so as to prevent the electrode 25 or 25' from being moved in the state in which the electrode is erected. In the bottom of the accommodation cavity 26 or 26, a movement prevention protrusion 35 protrudes through a protrusion hole 36, and is inserted into the movement prevention depression 33.

Therefore, if the movement prevention protrusion 35 is inserted into the movement prevention depression 33, the erected electrode 25 or 25' is prevented from being moved even when it comes into contact with the body of an animal or when an external shock is applied thereto.

Figure 5B:
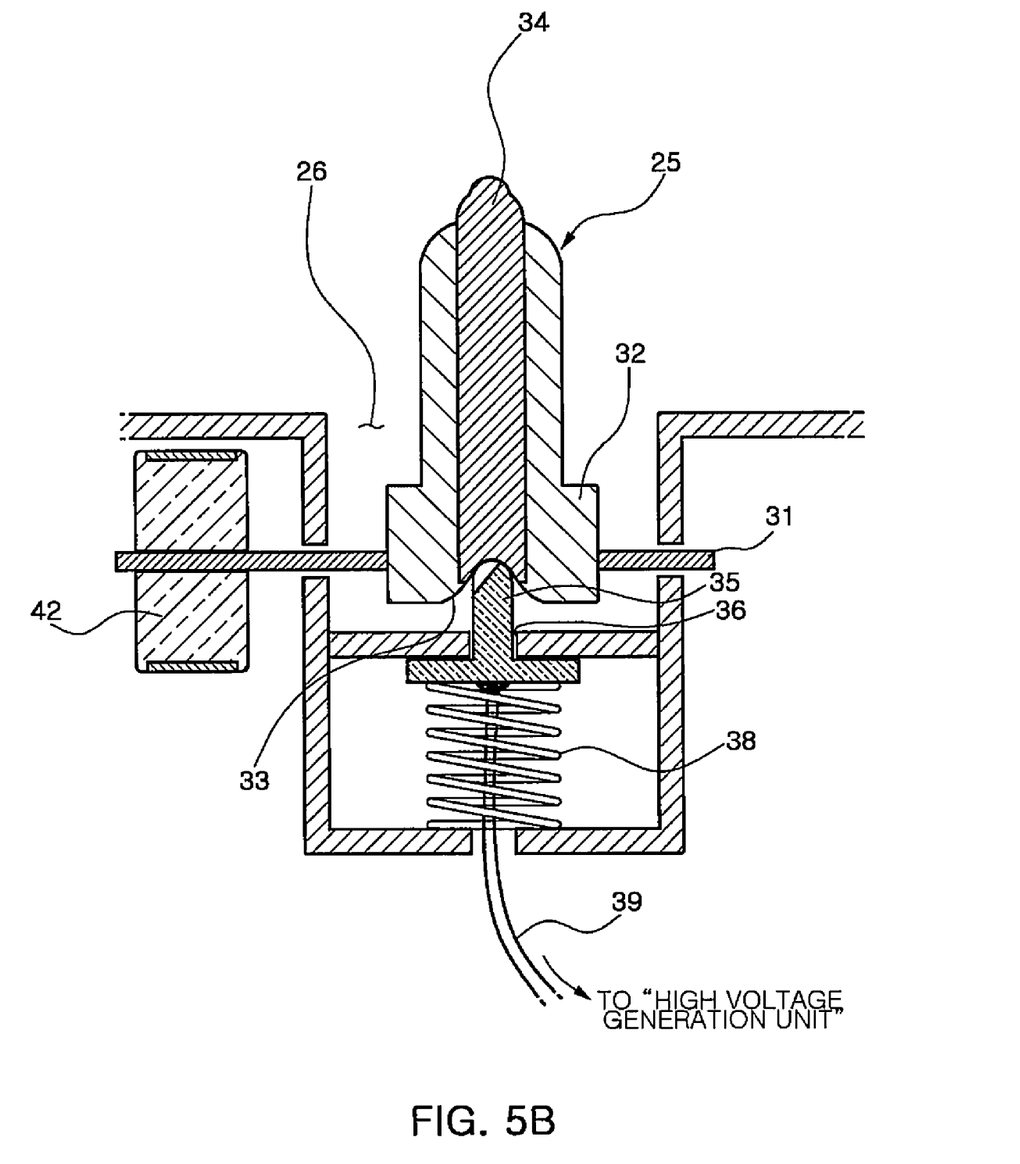
FIG. 5B is a longitudinal section view showing an electrode to be applied to the animal training device having a pair of collapsible electrodes and an electronic whistle according to the present invention.

The lower portion of a metal terminal 34 is exposed to the top of the movement prevention depression 33, and comes into contact with the movement prevention protrusion 35. The upper portion of the movement prevention protrusion 35 is a cylindrical shape having a hemispherical top, and the lower portion of the movement prevention protrusion 35 is a circularly-shaped plate having a diameter which is larger than that of the protrusion hole 36, as shown in FIG. 5.

The bottom of the movement prevention protrusion 35 is soldered and connected to a high voltage wire 39, so that a high voltage is applied thereto. The high voltage, generated by the high voltage generation unit 27, is applied to the metal terminal 34 through the high voltage wire 39 and the movement prevention protrusion 35.

The movement prevention protrusion 35 is subjected to the elastic force of a movement prevention spring 38 at the bottom thereof Therefore, as the electrode 25 is collapsed or erected through rotation, the movement prevention protrusion 35 slides while in contact with the movement prevention depression 33 in the bottom of the rotating rolling unit 32, and, simultaneously, is lowered downward or raised upward, thereby repeating retraction and protrusion through the protrusion hole 36.

The bottom of the movement prevention protrusion 35 has a circularly-shaped plate, the diameter of which is larger than that of the protrusion hole 36, so that the movement prevention protrusion 35 is prevented from passing through the protrusion hole 36 and then being separated by the elastic force of the movement prevention spring 38.

Further, the movement prevention depression 33 has a hemispherical center portion, which corresponds to the metal terminal 24, and at which the depth thereof is greatest The depth of the other portion becomes gradually shallow in the radially outward direction. Accordingly, the overall slope thereof is smooth, so that there are no stepped portions. As a result, the movement prevention protrusion 35 slides while in contact with the surface of the movement prevention depression 33, so that there is little friction in resistance to the collapse or erection motion of the electrode 25 or 25'.

As described above, when a user desires to terminate animal training and collapse electrodes in the state in which the electrodes 25 and 25' are erect, the user transmits the electrode collapse signal to the receiver 20 by pressing the electrode collapse switch 11.

When the reception control unit 23 for receiving an electrode collapse signal from the transmitter 10 receives the electrode collapse signal, the reception control unit 23 drives the electrode driving unit 24 such that the pair of electrodes 25 and 25' are collapsed and then accommodated in the respective accommodation cavities 26 and 26', as shown in FIG. 4B.

Figure 6:
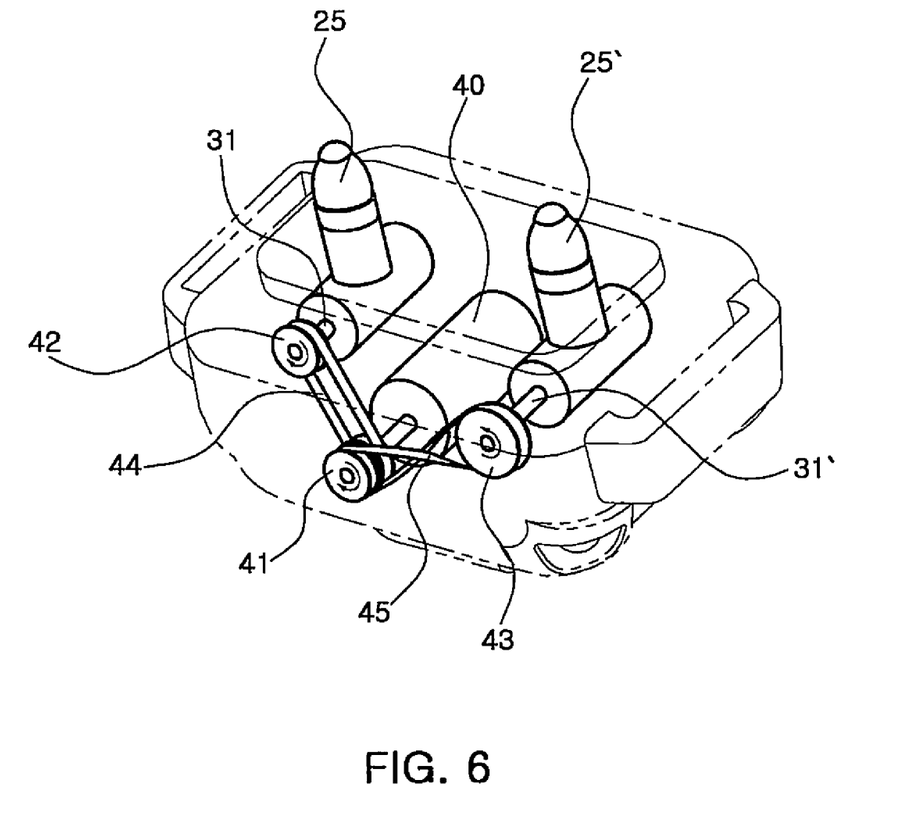
FIG. 6 is a view showing an embodiment of an electrode driving unit to be applied to an animal training device having a pair of collapsible electrodes and an electronic whistle according to the present invention.

FIG. 6 is a view showing an embodiment of an electrode driving unit which is applied to the animal training device having a pair of collapsible electrodes according to the present invention.

The electrode driving unit 24 according to the present invention includes a motor 40 configured to perform forward rotation and reverse rotation under the control of the reception control unit 24, a motor pulley 41 attached to the rotating shaft of the motor 40, left and right electrode rotating shafts 31 and 31 ' respectively attached to the pair of electrodes 25 and 25', a pair of electrode pulleys 42 and 43 attached to the respective left and right electrode rotating shafts 31 and 31' and configured to perform forward rotation and reverse rotation based on the rotation of the motor 40, and left and right electrode belts 44 and 45 configured to transmit power by connecting the pair of left and right electrode pulleys 42 and 43 to the motor pulley 41.

As the reception control unit 24 performs control such that the electrodes are collapsed, the motor 40 performs forward rotation (in the clockwise direction), so that the motor pulley 41 performs forward rotation. As the motor pulley 41 performs forward rotation in the clockwise direction, the left electrode belt 44 performs forward rotation in the clockwise direction, with the result that the left electrode pulley 42 performs forward rotation in the clockwise direction, so that the left electrode 25 performs rotation in the right direction, thereby being collapsed, as shown in FIG. 4B.

Meanwhile, as the motor 40 performs forward rotation in the clockwise direction, the motor pulley 41 performs forward rotation in the clockwise direction. As the motor pulley 41 performs forward rotation, the right electrode belt 45 performs forward rotation in the clockwise direction. However, the middle of the right electrode belt 45 is twisted and wound by the right electrode pulley 43, so that the right electrode pulley 43 performs reverse rotation in the counterclockwise direction even when the right electrode belt 45 performs forward rotation. As the right electrode pulley 43 performs reverse rotation, the right electrode 25' performs rotation in the left direction based on the rotating shaft 31', thereby being collapsed.

Conversely, when the electrode erection signal is received from the transmitter 10, the reception control unit 24 performs control such that the motor 40 performs reverse rotation (in the counterclockwise direction), so that the motor pulley 41 performs reverse rotation in the counterclockwise direction. As the motor pulley 41 performs reverse rotation, the left electrode belt 44 performs reverse rotation in the counterclockwise direction, with the result that that the left electrode pulley 42 performs reverse rotation in the counterclockwise direction, so that the left electrode 25 performs rotation in the counterclockwise direction based on the rotating shaft 31, thereby being erected.

Further, as the motor 40 performs reverse rotation in the counterclockwise direction, the motor pulley 41 performs reverse rotation in the counterclockwise direction. As the motor pulley 41 performs reverse rotation, the right electrode belt 45 performs reverse rotation in the counterclockwise direction. However, since the middle of the right electrode belt 45 is twisted and wound by the right electrode pulley 43, the right electrode belt 45 performs reverse rotation in the motor pulley 41, but the rotation direction thereof is changed in the course of rotation, thereby causing the right electrode pulley 43 to perform the forward rotation in the clockwise direction. As the right electrode pulley 43 performs forward rotation in the clockwise direction, the right electrode 25' performs forward rotation in the clockwise direction based on the rotating shaft 31', thereby being erected.

The present embodiment of the electrode driving unit 24 is one of various embodiments, and the present invention is not limited to the use of a pulley. That is, the objects of the present invention can be obtained by constructing the electrode driving unit using gears or another type of devices through a configuration such that the electrode driving unit can be collapsed or erected by hand.

In the case in which each of a pair of electrodes 25 and 25' is configured to be collapsed or erected by hand, the facts that the rotating rolling unit 32 is configured to be able to freely perform rotation in the accommodation cavity 26 or 26' based on the rotating shafts 31 or 31' without the electrode driving unit 24, that the movement prevention depression 33 is formed in the bottom of the rotating rolling unit 32, and that the movement prevention protrusion 35 is formed in the bottom of the accommodation cavities 26 and 26' are the same as in the above description.

Therefore, the electrodes 25 and 25', erected by the movement prevention depression 33 and the movement prevention protrusion 35, can be prevented from being moved even when they come in contact with the body of an animal or when an external shock is applied thereto.

Figure 7A:
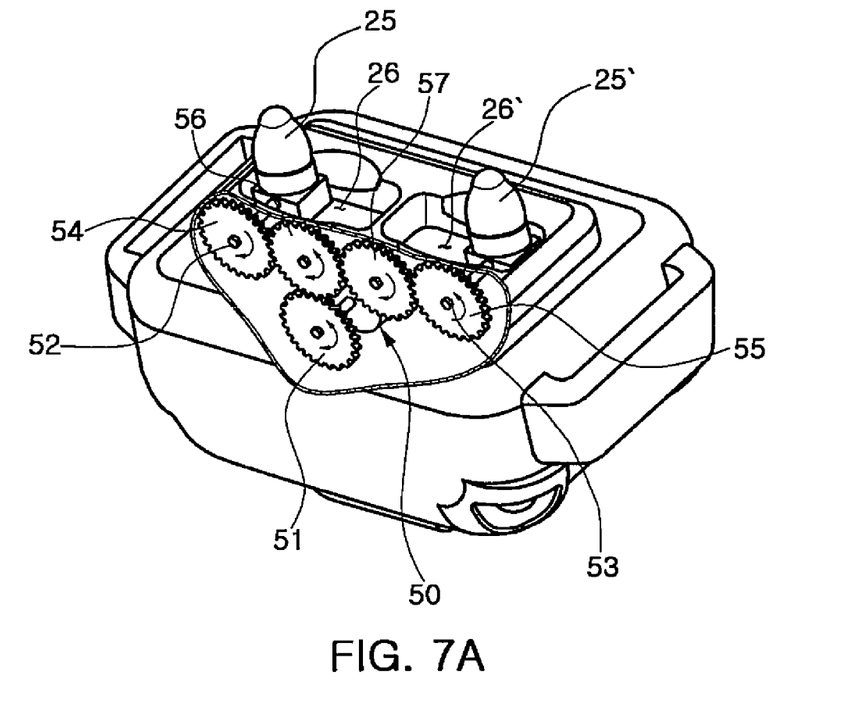
FIG. 7A is a view showing another embodiment of an electrode driving unit to be applied to an animal training device having a pair of collapsible electrodes and an electronic whistle according to the present invention.
Figure 7B:
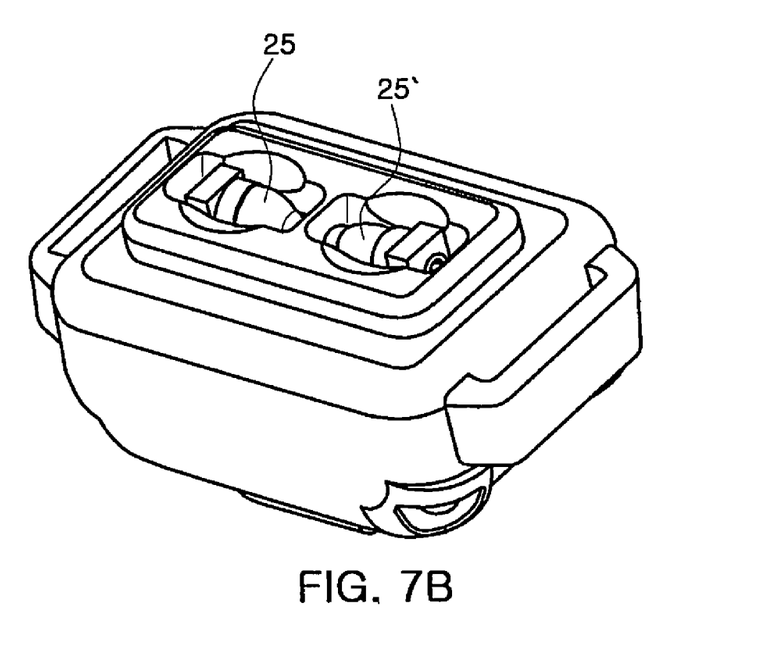
FIG. 7B is a perspective view showing the electrode driving unit of an animal training device having a pair of collapsible electrodes according to the present invention, which is formed of gears.

FIGS. 7A and 7B are views showing another embodiment of an electrode driving unit which is applied to the animal training device having a pair of collapsible electrodes according to the present invention.

In this embodiment, the electrode driving unit 24 according to the present invention includes a motor 50 configured to perform forward rotation and reverse rotation under the control of a reception control unit 23, a motor gear 51 attached to the rotating shaft of the motor 50, left and right electrode rotating shafts 52 and 53 respectively attached to the bottom of the pair of electrodes 25 and 25', a pair of left and right electrode gears 54 and 55 respectively attached to the left and right electrode rotating shafts 52 and 53 and configured to perform forward rotation and reverse rotation based on the rotation of the motor 50, a first transmission gear 56 configured to perform rotation while simultaneously engaging with the motor gear 51, the left electrode gear 54, and a second transmission gear 57, and the second transmission gear 57 configured to transmit the rotation power of the first transmission gear 56 to the right electrode gear 55.

As the reception control unit 24 performs control such that the electrodes are collapsed, the motor 50 performs forward rotation (in the clockwise direction), thereby rotating the motor gear 52 in the clockwise direction. The motor gear 52 causes the first transmission gear 56 engaging therewith to perform reverse rotation in the counterclockwise direction.

When the first transmission gear 56 performs reverse rotation in the counterclockwise direction, the left electrode gear 54 performs forward rotation through engagement therewith, so that the left electrode 25 performs forward rotation in the clockwise direction, thereby being collapsed, as shown in FIG. 7B.

In the same method, as the motor 51 performs forward rotation, the motor gear 52 performs forward rotation (in the clockwise direction). If the motor gear 52 performs forward rotation in the clockwise direction, the first transmission gear 57, engaged therewith, performs reverse rotation in the counterclockwise direction, and, simultaneously, the second transmission gear 58 performs forward rotation in the clockwise direction.

When the second transmission gear 58 performs forward rotation in the clockwise direction, the right electrode gear 55 performs reverse rotation in the counterclockwise direction. As the right electrode gear 55 performs reverse rotation in the counterclockwise direction, the right electrode 25' performs rotation in the counterclockwise direction, thereby being collapsed in the accommodation cavity 26'.

Further, when an electrode erection signal is received from the transmitter 10, the reception control unit 24 performs control such that the motor 50 performs reverse rotation (in the counterclockwise direction). Thereafter, the motor gear 52 performs reverse rotation in the counterclockwise direction. As the motor gear 52 performs reverse rotation in the counterclockwise direction, the first transmission gear 57 performs forward rotation in the clockwise direction, and the second transmission gear 58 performs reverse rotation in the counterclockwise direction.

When the first transmission gear 57 performs forward rotation in the clockwise direction, the left electrode gear 55 performs reverse rotation in the counterclockwise direction, so that the left electrode 25 is erected. If the second transmission gear 58 performs reverse rotation in the counterclockwise direction, the right electrode gear 56 performs forward rotation in the clockwise direction, so that the right electrode 25' is erected.

A preferred embodiment of the electronic whistle of the present invention will be described in detail with reference to the attached drawings below.

The electronic whistle of the present invention is provided in the transmitter 10, the electronic whistle switch 12 inputs a signal used to apply both an electronic whistle and an electric shock, and a signal used to only apply an electronic whistle, to the transmission control unit 13. When the transmission control unit 13 successively receives two input signals from the electronic whistle switch 12, the transmission control unit 13 performs control such that an electronic whistle is blown and the signal used to apply an electric shock is transmitted to the receiver 20. When the transmission control unit 13 receives a single input signal from the electronic whistle switch 12, the transmission control unit 13 performs control on the electronic whistle unit 15 such that only an electronic whistle is blown. Thereafter, the transmission control unit 13 receives a frequency signal and a sound signal respectively selected using the frequency switch 16 and the sound switch 17, and then performs control on the electronic whistle unit 15 such that an electronic whistle is blown using the selected frequency signal and sound signal.

Since the electronic whistle of the present invention is provided in the transmitter 10, the electronic whistle can be used to help an animal, which is being trained discern a direction, and can be used as a call signal because the electronic whistle can inform the animal of the location of a trainer.

Further, if an electronic whistle is used in combination with an electric shock signal, an electric shock may be applied to an animal that does not comply with an instruction given using the electronic whistle, as punishment, thereby improving the effect of training.

When the electronic whistle switch 12 is pressed once, a signal commanding only the electronic whistle to be blown is input to the transmission control unit 13. The transmission control unit 13 performs control on the electronic whistle unit 15 such that the sound of the electronic whistle is generated. Here, setting is made such that the sound of the electronic whistle is generated while the electronic whistle switch 12 is being pressed. If a trainer intermittently presses the electronic whistle switch 12, for example, if the trainer repeats the action of pressing the electronic whistle switch 12 for one second and then releasing it for one second, the sound of the electronic whistle can be generated for one second at a time interval of one second.

The sound of the electronic whistle that is intermittently generated is different from the sound of the electronic whistle that is continuously generated, so that it is possible to train an animal which is being trained to learn the continuous whistle sound and another message.

Further, the transmission control unit 13 performs control such that the sound of the electronic whistle is generated using frequency and sound, respectively selected using the frequency switch 16 and the sound switch 17. Therefore, different types of messages are transmitted to an animal which is being trained based on the pitch, that is, the frequency, thereby training the animal to act in response to one of the messages.

If the electronic whistle switch 12 is pressed twice in succession (for example, while maintaining a time interval between the first press and the second press within 100 ms), a signal used to cause an electronic whistle to be blown and simultaneously apply an electric shock is input to the transmission control unit 13.

The transmission control unit 13 performs control such that an electric shock generation signal is transmitted to the receiver 20 through the transmission antenna 16, so that the electrodes 25 and 25' of the receiver 20 generate electric shocks and simultaneously the electronic whistle unit 15 generates the sound of the whistle.

Figure 8:
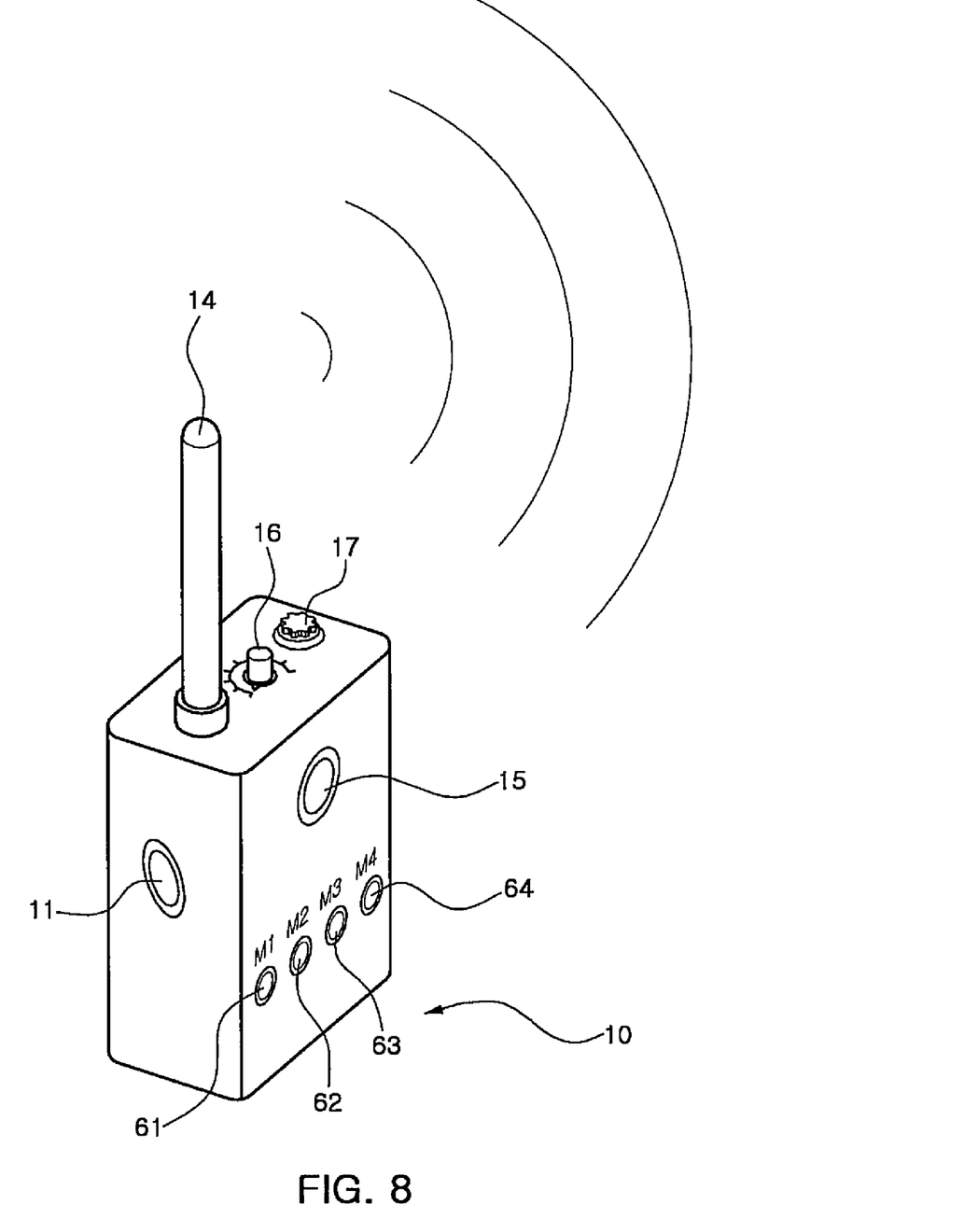
FIG. 8 is a perspective view showing the state of four mode switches provided in the transmitter of an animal training device having a pair of collapsible electrodes and an electronic whistle according to the present invention.

It is difficult for a general user to press the electronic whistle switch 12 two or more times in a short time period (for example, within 100 ms). Therefore, four mode switches 61 to 64 enables mode signals for performing operations in four modes, that is, an electronic whistle and electric shock mode M1, an electronic whistle mode M2, an intermittent electronic whistle mode M3, and an electronic whistle and vibration mode M4, to be input to the transmission control unit 13, as shown in FIG. 8.

Figure 9:
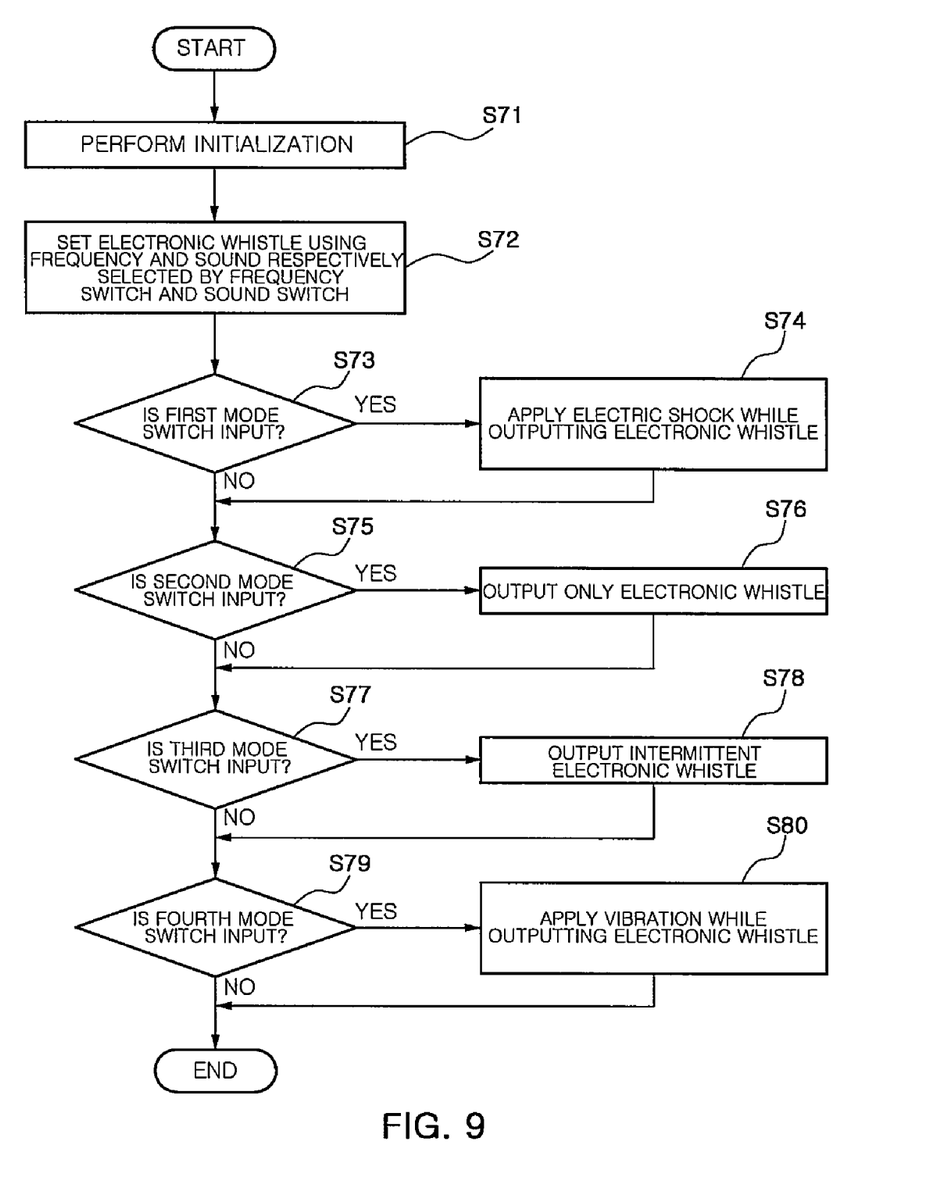
FIG. 9 is a flowchart showing a method of operating an electronic whistle of the animal training device according to the present invention using four modes.

FIG. 9 is a flowchart showing a method of operating the electronic whistle of the animal training device according to the present invention using the four modes.

Initialization is performed at step S71, a frequency signal and a sound signal, respectively selected using the frequency switch 16 and the sound switch 17, are received, and setting is made such that an electronic whistle is blown using the selected frequency and sound by the electronic whistle unit 15 at step S72.

The first mode switch 61 is pressed, and then whether a first mode (electronic whistle and electric shock) selection signal is input is determined at step S73. In the case in which the first mode selection signal is input, control is performed on the electronic whistle unit 15 such that an electronic whistle is output and simultaneously control is performed on a receiver such that an electric shock is applied to an animal by transmitting a signal used to apply an electric shock at step S74.

If, as the results of the determination at step S73, it is determined that the first mode selection signal has not been input, whether a second mode switch 62 has been pressed and a second mode (electronic whistle) selection signal has been input is determined at step S75. In the case in which the second mode selection signal has been input, control is performed on the electronic whistle unit 15 such that an electronic whistle is output at step S76.

If, as the results of the determination at step S75, it is determined that the second mode selection signal has not been input, whether a third mode switch 63 has been pressed and a third mode (intermittent electronic whistle) selection signal has been input is determined at step S77. In the case in which the third mode selection signal has been input, control is performed on the electronic whistle unit 15 such that an electronic whistle (a signal used to cause a whistle to be blown for one second at a time interval of one second) is intermittently output at step S78.

If, as the results of the determination at step S77, it is determined that the third mode selection signal has not been input, it is determined whether a fourth mode switch 63 has been pressed, and a fourth mode (electronic whistle and vibration) selection signal has been input at step S79. In the case in which the fourth mode selection signal has been input, control is performed on the electronic whistle unit such that an electronic whistle is output and simultaneously control is performed on the receiver 20 such that to a signal used to apply vibration is transmitted, so that vibration is applied to an animal from the receiver 20 at step S80.

As the results of the determination at step S79, if the fourth mode selection signal has not input, the relevant program is terminated.

The present program is provided as the subroutine program of a main routine program for controlling the animal training device of the present invention.

Therefore, since the present program functions as part of the main routine program, the termination of the present program means a return to the main routine if, as the results of the determination at step S79, it is determined that the fourth mode selection signal has not been input.

The present invention has advantages in that, when training is terminated or traveling, the electrodes of a receiver are collapsed, with the result that the time period for which the electrodes are in contact with the body of an animal is minimized, so that irritation generated due to contact between the body of an animal and electrodes can be reduced, in that the bother of putting a training dummy on the animal at times other than training times can be avoided, in that an electronic whistle and a switch for operating the same are provided in a transmitter, so that the bother of preparing an additional whistle can be avoided by enabling operation of an electronic whistle using a simple switch operation, and in that a command can be given to an animal in a remote place using the sound of an electronic whistle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An animal training collar having a pair of collapsible electrodes and an electronic whistle, comprising a transmitter and a receiver;

wherein the transmitter comprises:

an electrode collapse switch for generating a signal used to collapse or erect the pair of electrodes of a receiver;

an electronic whistle switch for generating a signal used to cause an electronic whistle to be blown;

a transmission control unit for receiving a signal from the electrode collapse switch and then transmitting the corresponding signal, and receiving a signal from the electronic whistle switch and then performing control on an electronic whistle unit such that a whistle is blown;

a wireless transmission unit for transmitting a wireless signal which corresponds to the signal from the electrode collapse switch in response to a control signal of the transmission control unit; and the electronic whistle unit for enabling a whistle to be blown under control of the transmission control unit; and wherein the receiver comprises:

a wireless reception unit configured to receive a signal from the transmitter;

a reception control unit configured to receive a command, instructing the electrodes to be collapsed or erected, from the wireless reception unit, and then to perform control such that the electrodes are collapsed or erected;

a high voltage generation unit configured to generate high voltage under control of the reception control unit;

an electrode driving unit configured to collapse or erect the electrodes under control of the reception control unit; and the pair of left and right electrodes configured to be collapsed or erected by receiving power from the electrode driving unit, and to receive high voltage electricity generated by the high voltage generation unit.

2. The animal training collar as set forth in claim 1, wherein the receiver further comprises:
- a pair of accommodation cavities configured to respectively accommodate the pair of collapsed electrodes;
- a pair of protrusion holes formed in bottoms of the respective accommodation cavities;
- a pair of movement prevention protrusions configured to protrude through the respective protrusion holes, and to have respective circularly-shaped bottoms, diameters of which are larger than those of the protrusion holes, and be inserted into respective movement prevention depressions formed in bottoms of the pair of electrodes; and
- a pair of movement prevention springs provided on bottoms of the respective movement prevention protrusions, and configured to supply elastic force transmitted through the protrusion holes.

3. The animal training collar as set forth in claim 1, wherein the electrode driving unit comprises:
- a motor configured to perform forward rotation and reverse rotation under control of the reception control unit;
- a motor pulley attached to a rotating shaft of the motor;
- left and right electrode rotating shafts respectively attached to the pair of electrodes;
- a pair of electrode pulleys attached to the respective left and right electrode rotating shafts, and configured to perform forward rotation and reverse rotation based on rotation of the motor; and
- left and right electrode belts configured to transmit power by connecting the pair of left and right electrode pulleys to the motor pulley.

4. The animal training collar as set forth in claim 1, wherein the electrode driving unit further comprises:
- a motor configured to perform forward rotation and reverse rotation under control of the reception control unit;
- a motor gear attached to a rotating shaft of the motor;
- left and right electrode rotating shafts respectively attached to bottoms of the pair of electrodes;
- a pair of left and right electrode gears respectively attached to the left and right electrode rotating shafts, and configured to perform forward rotation and reverse rotation based on rotation of the motor;
- a first transmission gear configured to perform rotation while simultaneously engaging with the motor gear, the left electrode gear, and a second transmission gear; and
- the second transmission gear configured to transmit rotation power of the first transmission gear to the right electrode gear.

5. The animal training collar as set forth in claim 1, wherein the transmission control unit performs control such that an electronic whistle is blown and a signal used to apply an electric shock is transmitted to the receiver when two input signals are successively received from the electronic whistle switch, performs control on the electronic whistle unit such that only an electronic whistle is blown when a single input signal is received from the electronic whistle switch, receives a frequency signal and a sound signal respectively selected using a frequency switch and a sound switch, and then performs control on the electronic whistle unit such that an electronic whistle is blown using the selected frequency signal and sound signal through the electronic whistle unit.

6. The animal training collar as set forth in claim 5, wherein the electronic whistle switch is replaced with four mode switches, so that mode signals for performing operations in four modes, that is, an electronic whistle and electric shock mode, an electronic whistle mode, an intermittent electronic whistle mode, and an electronic whistle and vibration mode, are input to the transmission control unit.

* * * * *